United States Patent
Pearl, II et al.

(10) Patent No.: US 9,897,237 B2
(45) Date of Patent: Feb. 20, 2018

(54) METHOD OF COUPLING HIGH PRESSURE FITTING

(71) Applicant: Uniweld Products, Inc., Fort Lauderdale, FL (US)

(72) Inventors: David S. Pearl, II, Fort Lauderdale, FL (US); Douglas B. Pearl, Hollywood, FL (US); Dragan Bukur, Fort Lauderdale, FL (US)

(73) Assignee: Uniweld Products, Inc., Fort Lauderdale, FL (US)

( * ) Notice: Subject to any disclaimer, the term of this patent is extended or adjusted under 35 U.S.C. 154(b) by 0 days.

(21) Appl. No.: 14/836,201

(22) Filed: Aug. 26, 2015

(65) Prior Publication Data

US 2015/0362102 A1    Dec. 17, 2015

Related U.S. Application Data

(63) Continuation of application No. 13/804,344, filed on Mar. 14, 2013.

(51) Int. Cl.

| F16L 37/22 | (2006.01) |
|---|---|
| F16L 15/08 | (2006.01) |
| F16L 27/08 | (2006.01) |
| F16L 37/088 | (2006.01) |

(Continued)

(52) U.S. Cl.
CPC .............. *F16L 15/08* (2013.01); *F16L 19/025* (2013.01); *F16L 27/0816* (2013.01); *F16L 37/088* (2013.01); *F16L 37/40* (2013.01)

(58) Field of Classification Search
CPC ......... F16L 15/08; F16L 37/088; F16L 37/40; F16L 27/0816
See application file for complete search history.

(56) References Cited

U.S. PATENT DOCUMENTS

| 1,908,844 A | 5/1933 | Holtson |
|---|---|---|
| 2,014,948 A | 9/1935 | McNeal |
| 2,218,318 A | 10/1940 | Pfauser |

(Continued)

FOREIGN PATENT DOCUMENTS

| DE | 20101826 U1 | 6/2002 |
|---|---|---|
| KR | 10-2011-0005753 A | 1/2011 |
| WO | 88/08499 A1 | 11/1988 |

OTHER PUBLICATIONS

International Search Report and Written Opinion mailed Jun. 24, 2014 in corresponding PCT application No. PCT/US2014/019373.

(Continued)

*Primary Examiner* — Ryan J Walters
(74) *Attorney, Agent, or Firm* — Nields, Lemack & Frame, LLC

(57) ABSTRACT

A fitting, such as an anti-blowback fitting, that includes a friction reducing device that enables easy removal of the fitting from a high pressure connection such as one associated with an HVAC unit. When used in connection with refrigeration, anti-blow back fittings function to keep the refrigerant in the hose to which it is connected in order to minimize or prevent the refrigerant from escaping to the environment. In certain embodiments, a friction reducing device is positioned in the fitting, and decreases the load on the rear housing, which enables easy rotation of the outer or swivel housing of the fitting to remove the same from the high pressure connection. In certain embodiments, the friction reducing device is a thrust bearing.

7 Claims, 5 Drawing Sheets

(51) Int. Cl.
*F16L 37/40* (2006.01)
*F16L 19/025* (2006.01)

(56) References Cited

U.S. PATENT DOCUMENTS

| | | |
|---|---|---|
| 2,436,206 A | 2/1948 | Deming |
| 2,726,104 A | 12/1955 | Boitnott et al. |
| 2,730,382 A | 1/1956 | De Mastri |
| 2,766,766 A | 10/1956 | White |
| 2,879,794 A | 3/1959 | Costello |
| 3,058,761 A | 10/1962 | Christophersen |
| 3,076,319 A | 2/1963 | White |
| 3,446,245 A | 5/1969 | Snyder, Jr. |
| 3,550,624 A | 12/1970 | Johnson |
| 3,706,318 A | 12/1972 | Baniadam et al. |
| 3,731,705 A | 5/1973 | Butler |
| 3,873,289 A | 3/1975 | White |
| 3,999,781 A | 12/1976 | Todd |
| 4,009,729 A | 3/1977 | Vik |
| 4,324,423 A | 4/1982 | Pitesky |
| 4,446,987 A | 5/1984 | White |
| 4,509,554 A | 4/1985 | Failla |
| 4,606,564 A | 8/1986 | Kurachi |
| 4,685,707 A | 8/1987 | Miyashita |
| 4,811,976 A | 3/1989 | Yagisawa |
| 5,058,859 A | 10/1991 | Chen |
| 5,060,987 A | 10/1991 | Miller |
| 5,118,141 A | 6/1992 | Miyashita |
| 5,165,734 A | 11/1992 | Smith |
| 5,222,369 A | 6/1993 | Hancock et al. |
| 5,248,125 A | 9/1993 | Fritch et al. |
| 5,340,163 A | 8/1994 | Merrer et al. |
| 5,366,261 A | 11/1994 | Ohmi et al. |
| 5,401,065 A | 3/1995 | Okumura et al. |
| 6,752,433 B2 | 6/2004 | Frost |
| 7,264,129 B2 | 9/2007 | Rilbe et al. |
| 7,290,562 B2 | 11/2007 | Kane |
| 7,497,482 B2 | 3/2009 | Sugiyama et al. |
| 7,575,024 B2 | 8/2009 | Zeiber et al. |
| 7,661,724 B2 | 2/2010 | Arosio |
| 7,874,314 B2 | 1/2011 | Zuck |
| 7,963,572 B2 | 6/2011 | Bull et al. |
| 2014/0265317 A1 | 9/2014 | Pearl et al. |

OTHER PUBLICATIONS

International Preliminary Report on Patentability mailed Apr. 6, 2015 in corresponding PCT application No. PCT/US14/19373.
Office action mailed May 16, 2014 in co-pending U.S. Appl. No. 13/804,344.
Office action mailed Nov. 13, 2014 in co-pending U.S. Appl. No. 13/804,344.
Final rejection mailed May 26, 2015 in co-pending U.S. Appl. No. 13/804,344.
Office action mailed Aug. 26, 2015 in co-pending U.S. Appl. No. 13/804,344.
Final rejection mailed Jan. 13, 2016 in co-pending U.S. Appl. No. 13/804,344.
Notice of Allowance mailed Mar. 2, 2016 in co-pending U.S. Appl. No. 13/804,344.
European communication dated Oct. 13, 2016 in corresponding European patent application No. 14775166.3.

METHOD OF COUPLING HIGH PRESSURE FITTING

This application is a Continuation of U.S. patent application Ser. No. 13/804,344 filed Mar. 14, 2013, the disclosure of which is incorporated herein by reference.

BACKGROUND

Mechanical air conditioning and refrigeration are accomplished by continuously circulating, evaporating, and condensing a fixed supply of refrigerant in a closed system. Charging or recharging an air conditioning or refrigeration system with refrigerant is done through the low side suction intake fitting with the use of manifold gauges and service hoses. There are several types of refrigerants used and some can be charged as a vapor and others must be charged as a liquid.

For example, R-410A is replacing R-22 refrigerant and is a mixture of HFC-32 and HFC-125, and is thus considered to be zeotropic. Zeotropic refrigerants such as R-410A must be charged as a liquid from a canister due to the possibility of fractionation of the blend of refrigerants it contains. The range of temperatures at which components in the blended components of R-410A refrigerant boil (temperature glide) is <0.3° F., making it a near-azeotropic refrigerant mixture.

Since the different components of zeotropic refrigerants such as R-410A have different boiling points, the components fractionate during boiling. That is, as the temperature increases, the lower boiling point components vaporize first. The vapor thus has a higher concentration of the lower boiling components than the liquid, and a lower concentration of the higher boiling components. When such a fluid blend is stored in a closed container in which there is a vapor space above the liquid, the composition of the vapor is different from the composition of the liquid. If the fluid is then removed from the container to charge an air conditioning system, for example, fractionation can take place, with accompanying changes in composition. Such changes can cause a refrigerant to have a composition outside of specified limits, to have different performance properties or even to become hazardous, such as by becoming flammable.

In general, R-410A pressures are 1.8 times higher than those of R-22, and can be over 600 psi. $CO_2$ is an example of another refrigerant gas that can run at a much higher pressure, as high as 1800 psi or more.

Low-pressure vapor refrigerant is compressed and discharged from the compressor as a high temperature, high-pressure, "superheated" vapor or liquid. The high-pressure refrigerant flows to the condenser, where it is changed to a low temperature, high-pressure liquid. It then flows through a filter dryer to a thermal expansion valve or TXV. The TXV meters the correct amount of liquid refrigerant into an evaporator. As the TXV meters the refrigerant, the high-pressure liquid changes to a low pressure, low temperature, saturated liquid/vapor. This saturated liquid/vapor enters the evaporator and is changed to a low pressure, dry vapor. The low pressure, dry vapor is then returned to the compressor. The cycle then repeats.

Because of the relatively high pressures involved, difficulties have arisen in removing fittings, such as anti-blowback fittings, coupled to high pressure, such as the hose connecting the high side of a refrigeration unit to the refrigerant source. The high pressure puts force on the connection, making it difficult to remove the fitting, especially manually.

It therefore would be desirable to provide a fitting that is easily removed from a high-pressure connection. It would be particularly desirable to provide a fitting that is easily removed from a high-pressure connection manually, i.e., without the need for a tool to apply torque to the fitting greater than can be applied by hand.

SUMMARY

The shortcomings of the prior art have been overcome by the embodiments disclosed herein, which relate to a fitting, such as an anti-blowback fitting, that includes a friction reducing device that enables easy removal of the fitting from a high-pressure connection such as that associated with an HVAC unit. When used in connection with refrigeration, anti-blow back fittings function to keep the refrigerant in the hose to which it is connected in order to minimize or prevent the refrigerant from escaping to the environment.

In certain embodiments, a friction reducing device is positioned in the fitting, and enables easy rotation of the outer housing of the fitting despite the axial load resulting from the high pressure connection, to remove the same from the high-pressure connection by hand and without the need for tools to supply sufficient torque.

DETAILED DESCRIPTION

Figure 1:
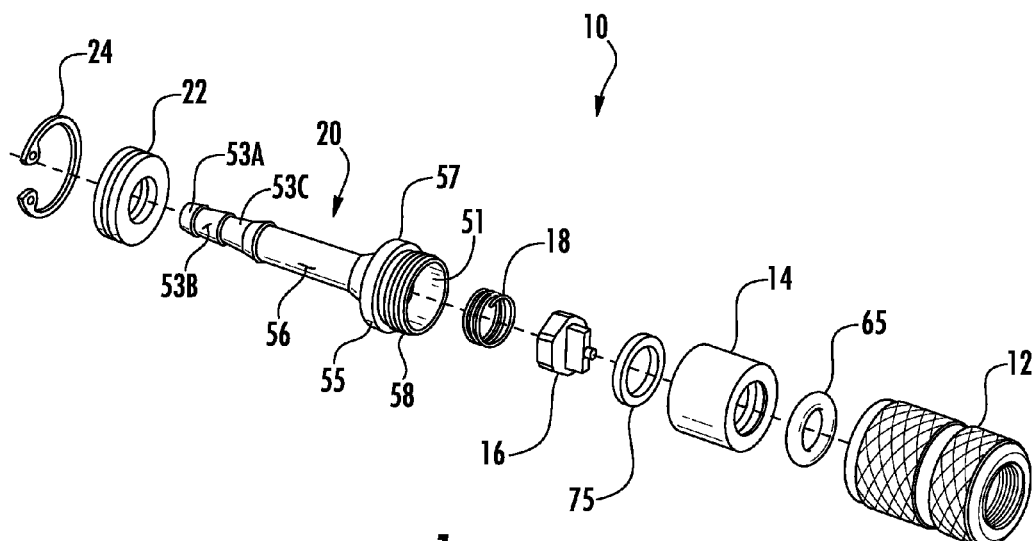
FIG. 1 is an exploded view of a fitting in accordance with certain embodiments.
Figure 2:
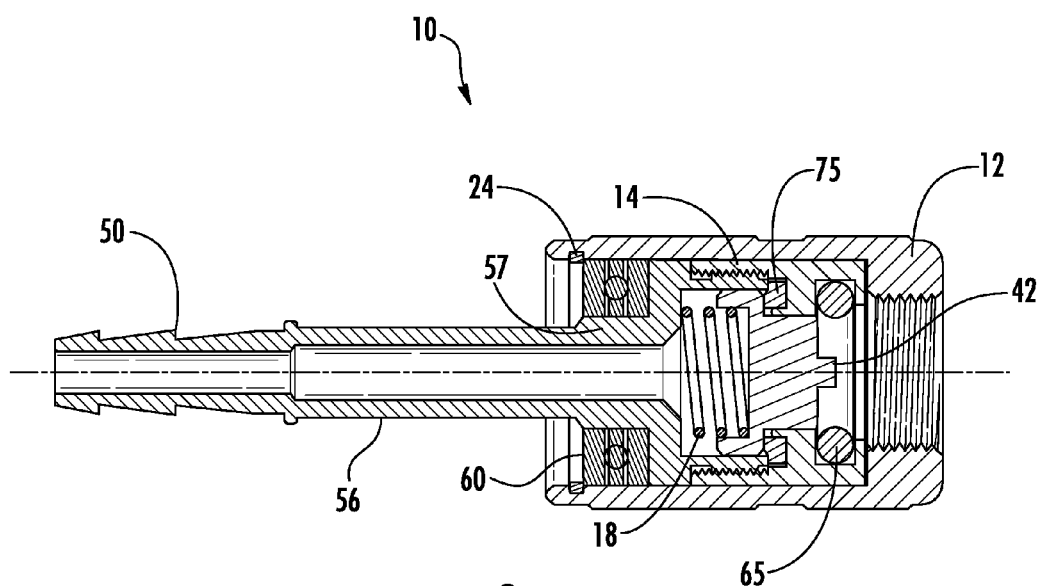
FIG. 2 is a cross-sectional view of the fitting of FIG. 1 in accordance with certain embodiments.

Turning first to FIGS. 1 and 2, there is shown a fitting 10, which in the embodiment shown, is an anti-blowback fitting. In accordance with certain embodiments, the fitting 10 includes an outer or swivel housing 12, front housing 14, depressor 16, biasing member 18, rear housing 20, friction reducing device 22, and retaining member 24.

Figure 3:
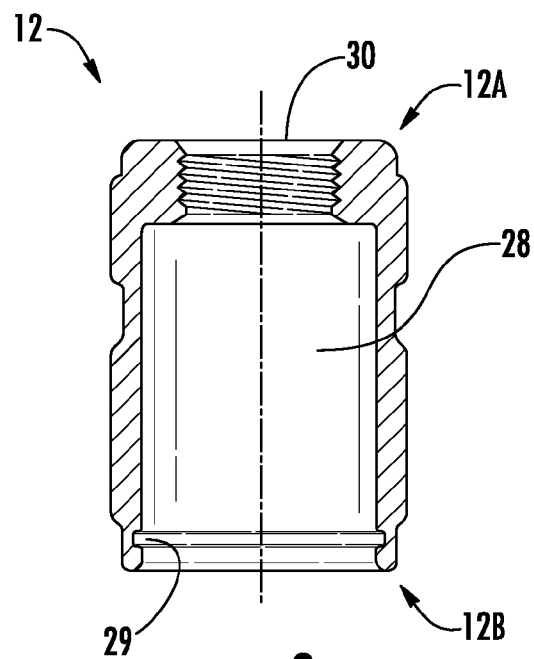
FIG. 3 is a cross-sectional view of a swivel housing in accordance with certain embodiments.

As best seen in FIG. 3, in accordance with certain embodiments the swivel housing 12 is generally cylindrical, and includes an internal cavity 28. The distal end 12A of the swivel housing 12 has a central bore 30 that is internally threaded so that it can mate with a corresponding threaded male member on the HVAC unit (not shown) to connect the fitting to the unit. The central bore 30 is in fluid communication with the internal cavity 28, and has an inner diameter less than the inner diameter of the central bore 30. Near the proximal end 12B of the swivel housing 12 there is formed an internal annular groove 29 to receive retaining member 24 as discussed in greater detail below. In certain embodiments, the internal cavity 28 houses the front housing 14, the depressor 16, the biasing member 18, a portion of the rear housing 20, the friction reducing device 22, and the retaining member 24.

Figure 4:
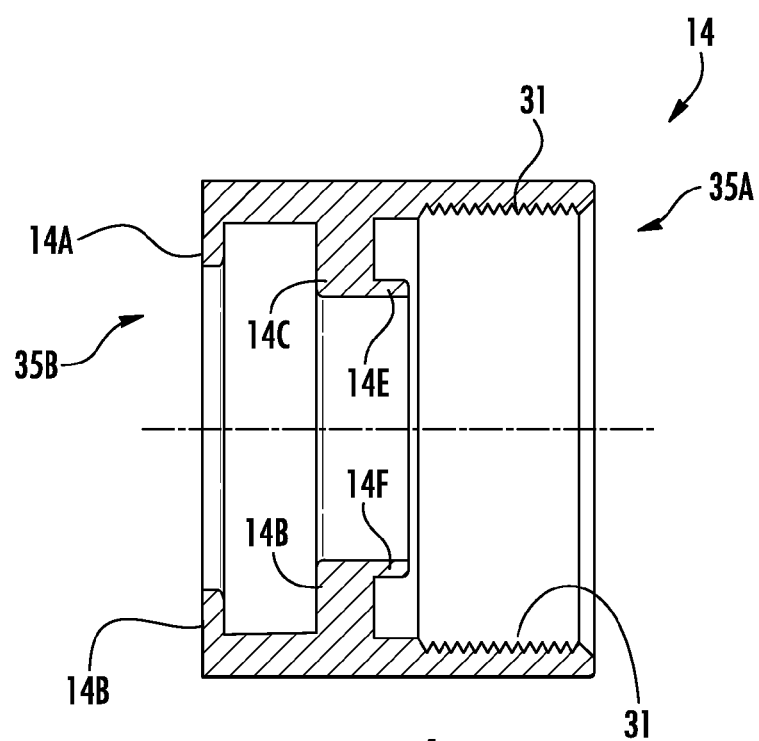
FIG. 4 is a cross-sectional view of a front housing in accordance with certain embodiments.

In accordance with certain embodiments, FIG. 4 shows a front housing 14 that is generally cylindrical and has an outer diameter smaller than the inner diameter of the swivel housing 12 so that the front housing 14 fits inside the swivel housing 12, as seen in FIG. 2. In certain embodiments, the housing 14 includes a distal end 35A having a region with internal threads 31, and a proximal end 35B with flanges 14A, 14B that extend radially inwardly from the end as shown. The flanges 14A, 14B retain O-ring 65 as seen in FIG. 2. An intermediate region includes flange members 14C, 14D, each having a main body that extends radially inwardly. Leg 14E extends axially from the main body of flange 14C in the direction of the distal end 35A, and leg 14F extends axially from the main body of flange 14D in the direction of the distal end 35A.

Figure 5A:
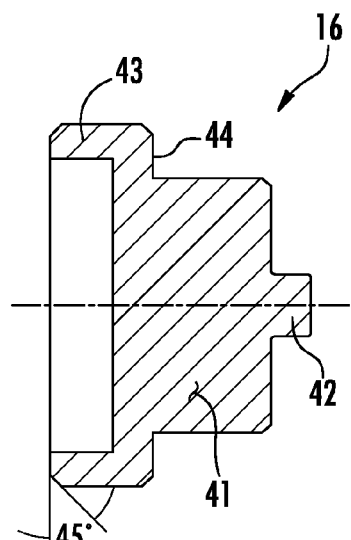
FIG. 5A is a cross-sectional view of a depressor in accordance with certain embodiments.
Figure 5B:
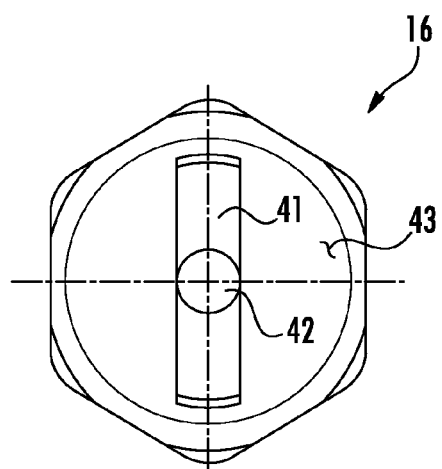
FIG. 5B is a top view of the depressor of FIG. 5A.

In accordance with certain embodiments, FIGS. 5A and 5B show a depressor 16 that is configured to be positioned inside the front housing 14 as shown in FIG. 2. The depressor 16 has a main body 41 that terminates at one end with a central axially extending member 42. The main body 41 sits on a hollow hexagonal base 43 as seen in FIG. 5B. When positioned in the front housing 14, the outer wall of the main body 41 abuts the outer walls of the flange members 14C, 14D and legs 14E, 14F of the outer housing 14, and a square seal 75 is positioned on the shoulder 44 and free distal end 55 of the rear housing 20. (FIG. 2). The depressor 16 is normally urged axially towards the distal end 30 of the swivel housing 12 by biasing member 18 that seats within the hollow region of the hexagonal base 43, as best seen in FIG. 2. When the force of the biasing member 18 is overcome such as by connection of the fitting to a high pressure unit, the depressor is forced axially away from the distal end 12A of the housing 12.

Figure 6:
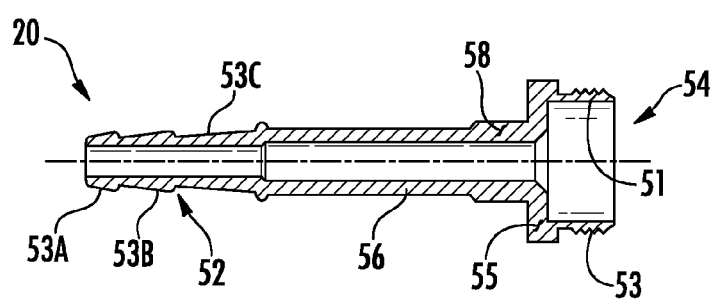
FIG. 6 is a cross-sectional view of a rear housing in accordance with certain embodiments.

In accordance with certain embodiments, FIG. 6 shows a rear housing 20. The housing 20 includes at the distal end 54 an axially extending ring 51 having external threads 58 that mate with internal threads 31 in the front housing 14. Extending axially from the ring 51 is a main body member 55, which seats the biasing member 18 (FIG. 2) and extends radially outwardly a distance greater than the diameter of the ring 51. In certain embodiments, the opposite proximal end of the housing 20 is an elongated barbed member 52 formed with a plurality of barbs 53A, 53B, 53C. Each barb is frusto conical in shape, tapering radially outwardly as it extends axially towards the distal end 54. The barb member 52 receives a hose (not shown) or the like. The barb member 52 includes an elongated leg 56 that connects the barbed portion to the main body member 55. The elongated leg 56 includes a region 57 of increased diameter 58 that is surrounded by friction reducing device 22 when in the assembled condition (FIG. 2). The barbs on the housing 20 are not necessary; connection can be made to the housing 20 by other suitable means, such as threads or a quick coupler.

Figure 7:
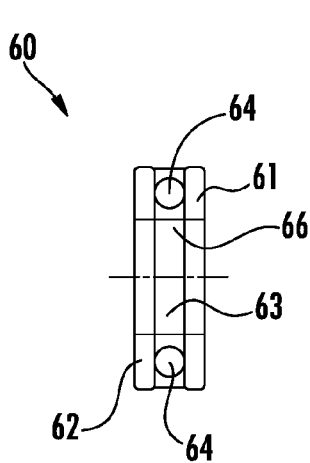
FIG. 7 is a cross-sectional view of a friction reducing device in accordance with certain embodiments.

In accordance with certain embodiments, FIG. 7 illustrates an embodiment of the friction reducing device 22. In the embodiment shown, the friction reducing device 22 is a thrust bearing that is a rotary type bearing that permits rotation between parts, while supporting an axial load. In accordance with certain embodiments, the thrust bearing includes outer washers 61, 62 that sandwich an inner cage 63. The washers 61, 62 may be made of stainless steel or other suitable material, and the inner cage 63 of nylon or metal, for example. The washers 61, 62 and inner cage 63 each has a central bore 66 that align when in the assembled condition. The inner cage 63 has a plurality of apertures, each receiving a ball bearing 64 held in place by the outer washers 61, 62. Although a thrust ball bearing is illustrated, those skilled in the art will appreciate that other types of friction reducers may be used, such as thrust roller bearings, slip washers or plates, or other known friction reducing members as discussed in greater detail below. The slip washers or plates can be made of or coated with polytetrafluoroethylene (Teflon®) or the like, for example. The friction reducing device 22 is positioned in the swivel housing 12 such that it abuts against the rear wall of the main body member 55 of the rear housing 20, and the region 57 of the main body member 55 is received in the central bore 66 of the device 22, as best seen in FIG. 2. The upstream outer washer 62 rotates with the swivel housing 12, while the downstream outer washer 61 does not. This reduces friction between swivel housing 12, rear housing 20 and retaining member 24, and allows for manual rotation of the swivel housing despite the axial load caused by the high pressure connection.

Figure 8:
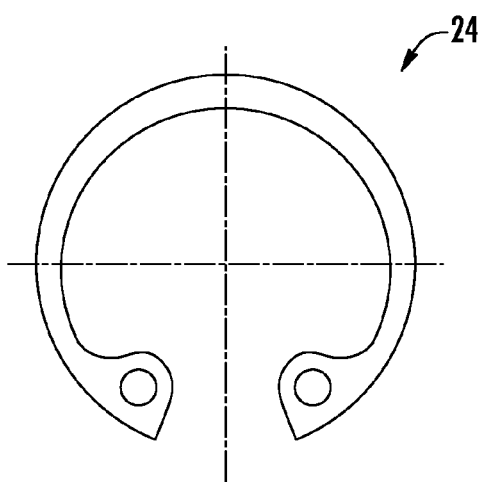
FIG. 8 is a cross-sectional view of a retaining member in accordance with certain embodiments.

In accordance with certain embodiments, FIG. 8 shows a retaining member 24. The retaining member 24 is resilient, preferably made of steel, and is force fit into annular groove in the swivel housing 12. It abuts against the friction reducing device 22 and retains it in place in the fitting 10.

The swivel housing 12 is rotatable relative to the depressor 16, the front housing 14, the biasing member 18, the rear housing 20, and a portion of the friction reducing device 22.

Figure 9:
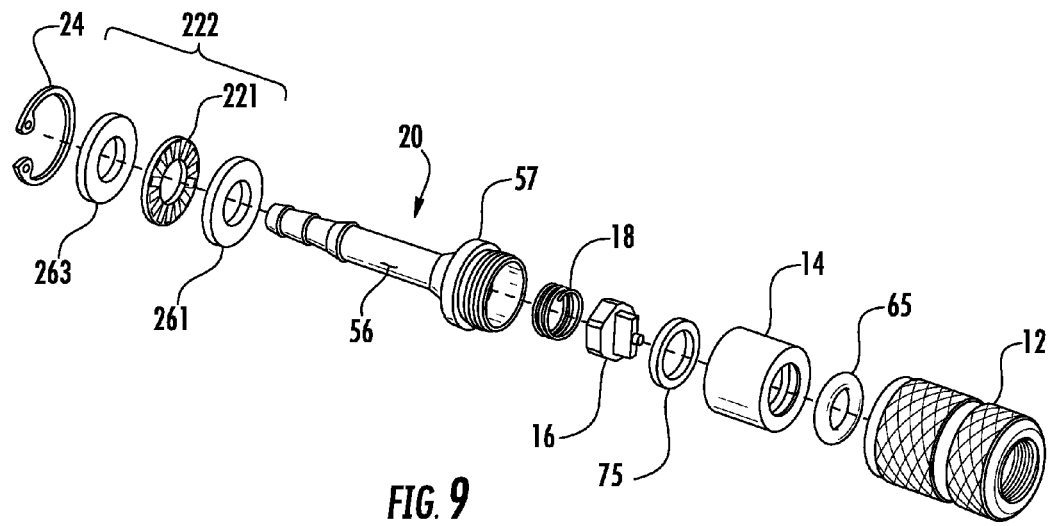
FIG. 9 is an exploded view of a fitting in accordance with another embodiment.
Figure 10:
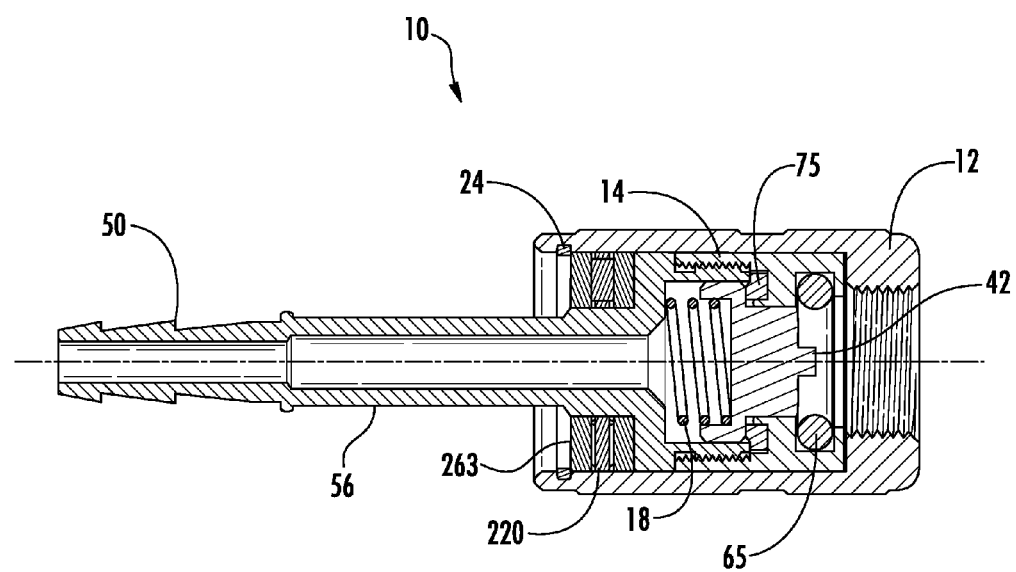
FIG. 10 is a cross-sectional view of the fitting of FIG. 9.

FIGS. 9 and 10 illustrate another embodiment of the friction reducing device. In accordance with certain embodiments, the friction reducing device 222 of FIGS. 9 and 10 is a needle roller bearing 221, made of stainless steel, for example, sandwiched by downstream washer 261 and upstream washer 263. The washers 261 and 263 can be made of plastic. In certain embodiments, the needle rollers are equally spaced by means of a cage whose web section separates the rollers and provides guidance to keep them tracking in an orbital path. It transmits thrust loads between two relatively rotating objects while reducing friction.

Figure 11:
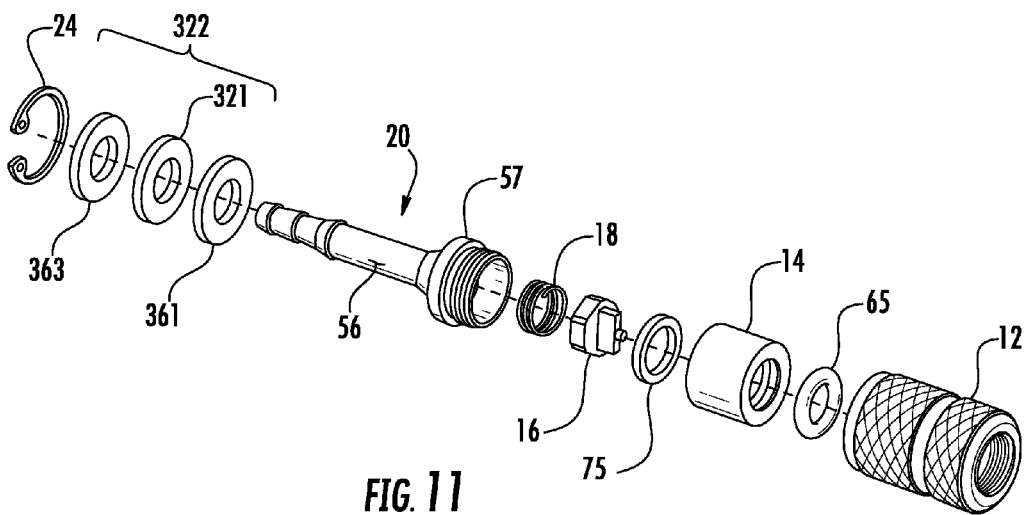
FIG. 11 is an exploded view of a fitting in accordance with yet another embodiment.
Figure 12:
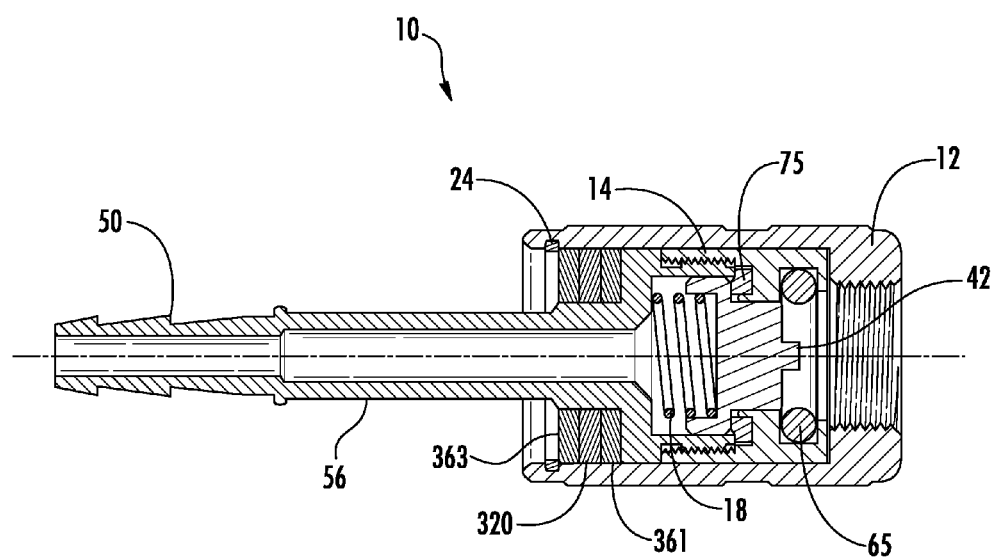
FIG. 12 is a cross-sectional view of the fitting of FIG. 11.

FIGS. 11 and 12 illustrate another embodiment of the friction reducing device. In accordance with certain embodiments, the friction reducing device 322 of FIG. 10 and is a thrust bearing washer 321, made of plastic, for example, sandwiched by downstream washer 361 and upstream washer 363. The washers 361 and 363 also can be made of plastic.

In operation in certain embodiments, the fitting 10 is coupled to a hose or the like which is connected to an access fitting on the unit being serviced or the refrigerant source (or a vacuum pump) and whose other end is connected to a refrigerant charging manifold. In certain embodiments, the connection to the access fitting (or refrigerant source or vacuum pump), for example, is connected via internal threads in the swivel housing 12 that mate with an access fitting containing a Shrader valve (not shown) or the like. The Shrader valved access fitting or the like has a pin that contacts and depresses depressor 16 against the force of biasing member 18, moving the depressor 16 axially in a direction away from the access fitting, opening both the fitting 10 and the Shrader valve to create fluid communication between the hose and the unit being serviced. This axial movement opens a passageway between the perimeter of depressor 16 and the front housing 14 and distal end of rear housing 20, allowing fluid to flow from the manifold through the fitting and into the hose or the like (not shown) attached to the fitting at the proximal end of rear housing. When the operation is complete, removal of the fitting from the high pressure connection can be carried out by manual rotation of the swivel housing 12, due to the presence of the friction reducing device 22, 222, 322 which causes the depressor 16 to move axially way from the access fitting. The force of the biasing member 18 then causes the depressor 16 to move axially towards the proximal end of the swivel housing 12, closing the passageway and blocking the flow of fluid.

In certain embodiments, a Shrader valve is not necessary; the anti-blowback valve can be attached directly to a standard access fitting provided the fitting is shaped to depress the depressor axially when in the assembled condition.

The fitting disclosed herein reduces the torque required to remove it from connections under virtually any amount of pressure, and is especially advantageous the higher the pressure is. For example, at pressures of 500 psi, anti-blowback fittings with the friction reducing device required about 20% less torque (as measured with a torque wrench (inch-pounds)) to remove it from a connection than a conventional anti-blowback fitting devoid of a friction reducing device. At pressures of 600 psi, anti-blowback fittings with the friction reducing device required about 25% less torque (as measured with a torque wrench (inch-pounds)) to remove it from a connection than a conventional anti-blowback fitting devoid of a friction reducing device.

What is claimed is:

1. A method of de-coupling an anti-blow back fitting from an access fitting of a system under high pressure to which said anti-blow back fitting is attached, said anti-blowback fitting having an outer housing having internal threads for mating with said access fitting, a rear housing partially disposed in said outer housing and threaded inside said outer housing, a depressor in said outer housing moveable axially therein between an open and closed position, a biasing member in said outer housing biasing said depressor into said closed position, and a friction reducing member positioned in said outer housing and about a region of said rear housing so as to reduce friction between said outer housing and said rear housing sufficient to allow manual rotation of said outer housing relative to said rear housing when subject to an axial load from the high pressure in said system; said method comprising:
manually rotating said outer housing relative to said rear housing to decouple said internal threads of said outer housing from said access fitting and disconnect said anti-blowback fitting from said access fitting while under high pressure.

2. The method of claim 1, wherein said friction reducing member comprises a thrust bearing.

3. The method of claim 1, wherein said friction reducing member comprises a thrust ball bearing.

4. The method of claim 1, wherein said friction reducing device comprises a needle roller bearing.

5. The method of claim 1, wherein said friction reducing device comprises a washer.

6. The method of claim 1, wherein said rear housing of said anti-blow back fitting has at least one barb for connection to a hose.

7. The method of claim 1, wherein said depressor comprises a hexagonally-shaped base.

* * * * *